No. 669,957. Patented Mar. 12, 1901.
E. M. HEYLMAN.
WHEEL PLOW.
(Application filed Nov. 16, 1900.)

(No Model.) 2 Sheets—Sheet 1.

Witnesses.
Nora Graham.
Ina Graham.

Inventor,
E. M. Heylman
by L. P. Graham
his attorney.

No. 669,957. Patented Mar. 12, 1901.
E. M. HEYLMAN.
WHEEL PLOW.
(Application filed Nov. 16, 1900.)

(No Model.) 2 Sheets—Sheet 2.

Witnesses,
Nora Graham
Ira Graham

Inventor.
E. M. Heylman
by L. P. Graham
his attorney

UNITED STATES PATENT OFFICE.

EDWARD M. HEYLMAN, OF CANTON, ILLINOIS, ASSIGNOR TO PARLIN AND ORENDORFF COMPANY, INCORPORATED, OF SAME PLACE.

WHEEL-PLOW.

SPECIFICATION forming part of Letters Patent No. 669,957, dated March 12, 1901.

Application filed November 16, 1900. Serial No. 36,729. (No model.)

*To all whom it may concern:*

Be it known that I, EDWARD M. HEYLMAN, of the city of Canton, county of Fulton, and State of Illinois, have invented certain new and useful Improvements in Wheel-Plows, of which the following is a specification.

This invention relates to means for raising and lowering plows in a wheel-sustained frame. It is exemplified in the structure hereinafter described and it is defined in the appended claims.

Figure 1:
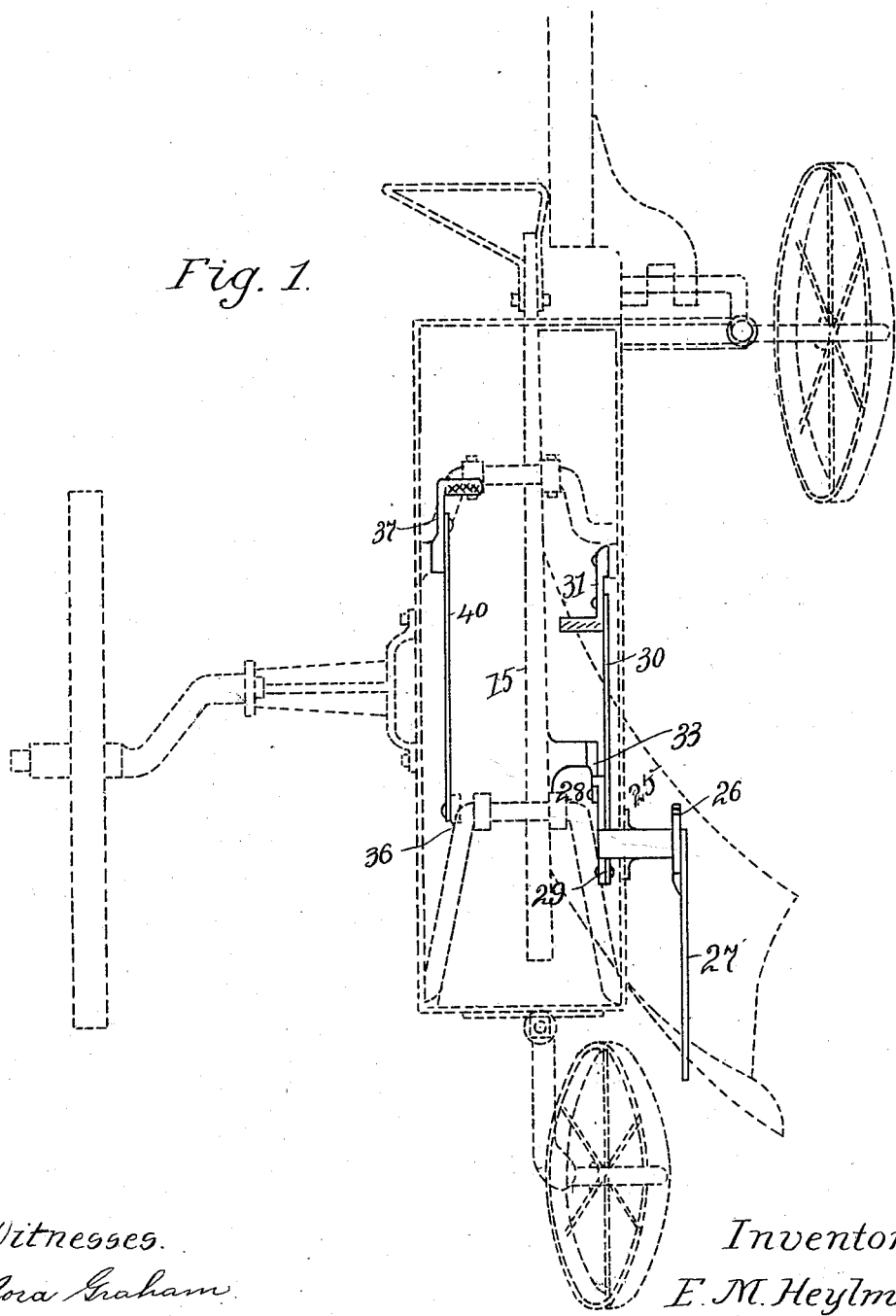
Figure 2:
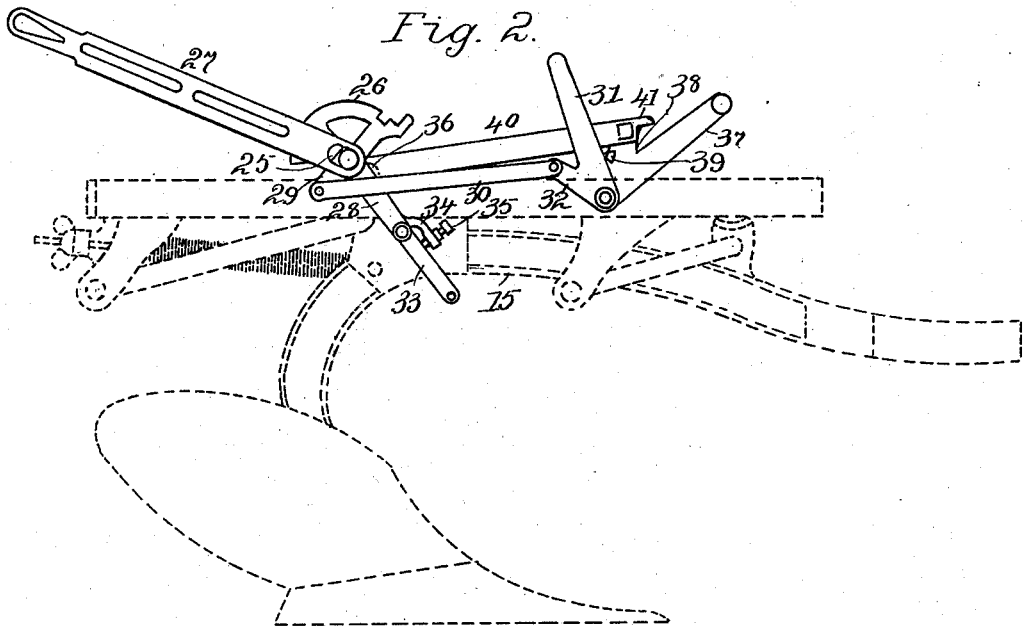
Figure 3:
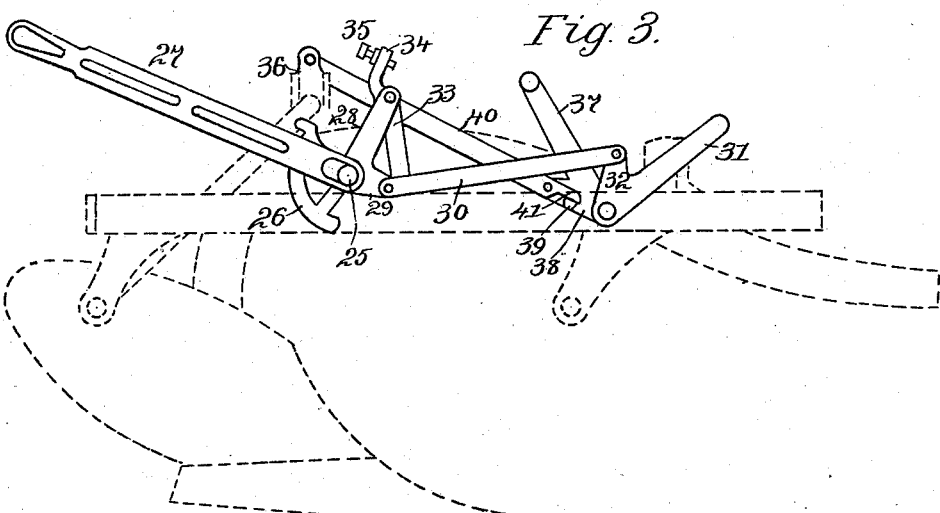

In the drawings forming part of this specification, Figure 1 is a plan showing the general configuration of a wheel-plow in dotted lines and representing the features in which my invention resides in solid lines. Fig. 2 is a side elevation of the plow raising and lowering mechanism, showing the plow-beam lowered. Fig. 3 is a similar view showing the plow-beam raised.

A shaft 25 is journaled in a sleeve-bracket attached to a side of the plow-frame, a quadrant 26 is fixed onto the outer end of the shaft, and a hand-lever 27 is fulcrumed on the shaft in position to engage a notch of the quadrant when swung forward. On the inner end of shaft 25 is fixed an arm 28, having a bell-crank extension 29, and a link 33 connects the swinging end of the arm with the plow-beam 15. A finger 34 on arm 28 extends above the link 33, and a set-screw 35 provides means for limiting the swing of the arm with relation to the link. A foot-lever 31 is pivoted to the frame on the same side thereof as the arm 28; but in front of such arm a bell-crank extension 32 is formed on foot-lever 31, and a stiff link-bar 30 connects pivotally at one end with bell-crank extension 29 of arm 28 and at the other end with extension 32 of foot-lever 31. These parts constitute the lifting mechanism for the plow-beam, and they are so disposed that when the plow is lowered, as shown in Fig. 2, the arm 28 and link 33 are approximately in line. Whether or not the arm and the link establish a dead-center lock to hold the plow lowered depends on the adjustment of set-screw 35, and the plow may be locked firmly in the ground or the centers may be held out of line sufficiently to permit the plow to rise on encountering an immovable obstruction. When the plow is lowered, the foot-lever 31 inclines backward, and when it is desired to raise the plow forward pressure on the foot-lever carries arm 28 upward and raises the plow to the position shown in Fig. 3. The lifting mechanism is particularly applicable to plows swung on bails and partly supported by springs, and under these circumstances the foot-lever will ordinarily be sufficient; but to provide for unusual circumstances and different environments the hand-lever 27 and notched quadrant 26 are made part of the lifting mechanism. So long as the hand-lever is not needed it lies in the position shown in the drawings, and whenever it is needed it is swung forward until a tooth or bolt engages the notch of the quadrant, the plow being lowered, and backward pull on the lever will then be transmitted to the plow-beam through the quadrant, the arm, and the link. This provision enables the application of foot-pressure or hand-pressure or both hand-pressure and foot-pressure to the raising of the plow.

To hold the plow raised and provide for lowering the plow by foot action, a second foot-lever 37 is fulcrumed in the plow-frame opposite lever 31, and a bell-crank extension 38 of lever 37 is connected with the rear bail-bracket 36 of the plow-beam through a stiff link-bar 40. The link 40 has a finger 41 extending forward beyond its pivot with the foot-lever, and a stop-block 39 on extension 38 of the lever limits the swing of the link on the lever. When the plow is raised, the foot-lever 37 swings forward, as shown in Fig. 8, and the extension 38 and link 40 form a dead-center lock to hold the beam raised. When the beam is to be lowered, the foot-lever is pushed forward sufficiently far to break the dead-center lock and permit the plow to descend.

I claim—

1. In a plow-lift, the combination of a lift-arm connecting with the plow-beam through a stiff link and forming with the link an extended toggle-joint when the plow is lowered, a foot-lever to actuate the lift-arm and a second foot-lever connecting with the plow-beam through a stiff link and forming with the link a dead-center lock to hold the plow raised, substantially as described.

2. In a plow-lift, the combination of a lift-arm connecting with the plow-beam through a stiff link and forming with the link an extended toggle-joint when the plow is lowered, a foot-lever to actuate the lift-arm, a second foot-lever connecting with the plow-beam through a stiff link and forming with the link a dead-center lock to hold the plow raised, and a hand-lever engageable with the lift-arm, substantially as described.

In testimony whereof I sign my name in the presence of two subscribing witnesses.

EDWARD M. HEYLMAN.

Witnesses:
A. L. GARDNER,
GEO. W. POWELL.